United States Patent [19]

Goodman

[11] 3,770,871
[45] Nov. 6, 1973

[54] PRESSURIZED CABLE SYSTEM WITH LOWER PRESSURE SPLICE CASE

[76] Inventor: Jack P. Goodman, 2500 S. Tejon, Englewood, Colo. 80110

[22] Filed: May 26, 1972

[21] Appl. No.: 257,132

[52] U.S. Cl. .............................. 174/11 R, 174/22 R
[51] Int. Cl. ...................... H02g 15/26, H02g 15/24
[58] Field of Search .............. 174/11 R, 15 C, 21 R, 174/22 R, 22 C, 23 R

[56] References Cited
UNITED STATES PATENTS

| | | | |
|---|---|---|---|
| 1,933,348 | 10/1933 | Shanklin | 174/11 R UX |
| 2,261,742 | 11/1941 | Matsumoto | 174/21 R |
| 2,449,271 | 9/1948 | Bennett et al. | 174/11 R |
| 3,321,568 | 5/1967 | Venturelli | 174/21 R |
| 3,629,487 | 12/1971 | Cuthbert et al. | 174/23 R X |

*Primary Examiner*—Laramie E. Askin
*Attorney*—Richard D. Law

[57] ABSTRACT

The conduit or covering of a pressurized cable system is dammed on both sides of a splice, and a by-pass conduit provides a pressure system around the splice. A covering or case over the splice is pressurized from the by-pass to a lesser pressure than that in the main conduit, but still providing a moisture proof covering for the splice.

1 Claim, 4 Drawing Figures

PATENTED NOV 6 1973

3,770,871

PRESSURIZED CABLE SYSTEM WITH LOWER PRESSURE SPLICE CASE

BACKGROUND OF THE INVENTION

In modern communication systems, telephone cables or wires are in many instances placed in a conduit which is pressurized to prevent ingress of moisture into the wires contained in the conduit. A break, either intentional or accidental, in the cable, of course, depressurizes the cable and a splice must be made at the point of the break. Conventional method of splicing the cable in such pressurized systems is to extend the end of the cable or cables to be spliced into a splice case, make the necessary splices, and seal the splice case around its edges and, also, the cable in the splice case ends. Air under pressure enters the splice case from the cable, passes through the case and on into the other cable end at the opposite side of the splice case. This pressurizes the complete system. However, if one splice case in the system is not tight to cable pressure, all of the system, including the splice cases and the cable, will lose air or gas with probable damage due to moisture entering the cases and the cable.

In a pressurized cable communiation system, the cable is pressurized with dry air at a central office. The cable and all its components, including the splice cases and the systems, are maintained at a pressure of about 6 – 10 pounds per square inch, provided, however, that the complete system is sealed for this particular pressure. The splice cases, which are considerably larger in diameter than the cable itself, must be designed for this pressure. Additionally, it is difficult to sufficiently seal around the edges of the splice cases and at the ends where the cable enters the case, to hold this pressure in the splice case. Cables under about 10 pounds per square inch air pressure may properly maintain air flow and pressure in the cable, whereas only about three pounds per square inch is necessary in a splice case to keep out the moisture.

THE INVENTION

The present invention provides a means and apparatus for by-passing a splice with the full pressure of a pressurized cable communications system, providing a lower pressure splice case which is satisfactory to maintain the spliced cables dry and while maintaining the cable at full pressure. The apparatus includes a by-pass from cable end to cable end around a splice case with a reduced pressure take-off for pressurizing the splice case with less than line pressure.

Included among the objects and advantages of the present invention is a method of splicing pressurized communication cable systems, particularly at splice joints in the cable.

Another object of the invention is to provide apparatus for pressurizing a cable in a pressurized cable communications system to full pressure while maintaining splice cases at less than the line pressure.

Another object of the invention is to provide a method of maintaining a pressurized cable communication system at full pressure while maintaining splice cases in the cable line at a lesser pressure without loss to the system.

An additional object of the invention is to provide splicing means for pressurized cable communication systems including a low pressure splice case for a spliced cable and a by-pass around the splice providing full pressure from cable to cable and a low pressure bleed into the splice case for maintaining a lower pressure therein.

These and other objects and advantages of the invention may be readily ascertained by referring to the following descriptions and appended illustrations:

Figure 1:
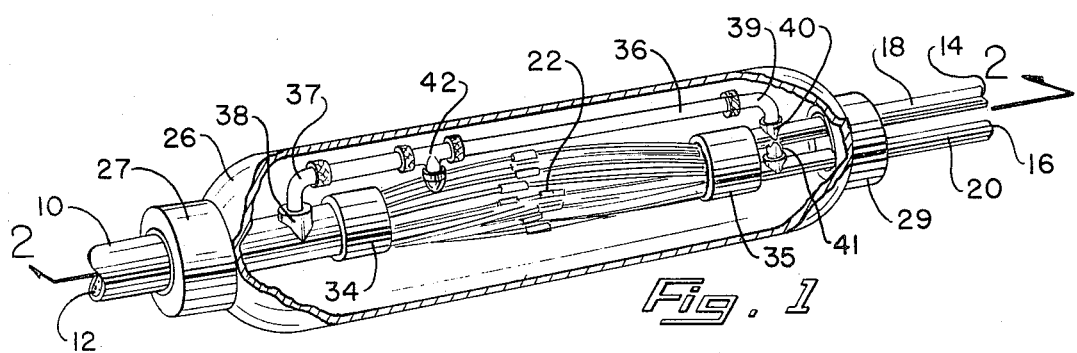
FIG. 1 is a cut-away perspective view of one form of the invention illustrating an internal by-pass system in a splice case for pressurized cable communication system.
Figure 2:
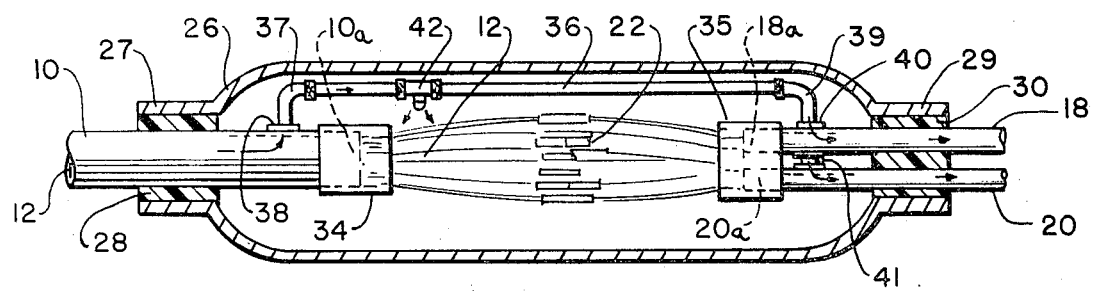
FIG. 2 is a cross-sectional view of the device of FIG. 1 taken along section line 2—2.

In the device illustrated in FIGS. 1 and 2, a cable 10 encloses a plurality of lines or wires 12 which are arranged to be spliced to lines 14 and 16 in cables 18 and 20. In the area of splice 22, the lines are pulled apart and are spliced to corresponding lines from cables 18 and 20. The splice cover 26 covers the splice area 22, and it is sealed at end 27 by means of a potting compound 28 to the conduit or covering for cable 10. The opposite end 29 of the splice case 26 is, likewise, sealed around cables 18 and 20 by means of the potting compound 30. The potting compound is a common commodity used in all types of electrical work including the communications industry and may be an epoxy potting or similar compound. The potting compound is mixed as two liquids forming a liquid which sets quite rapidly to a solid. A dam 34, formed of potting compound, seals end 10a of the cable 10, thereby sealing the lines 12 in the compound. This completely seals the conduit or covering of cable 10 permitting pressurization of the conduit 10. In a similar manner a dam 35 seals end 18a of the cable 18 and the end 20a of cable 20 rendering both cables pressure proof. These dams are formed of the potting material, and it is applied as a liquid so that it completely fills all the crevices and holes at the end of the cable and completely seals each end of the cable and around the wires which extend from the covering of the cable.

A by-pass 36 is secured to an elbow 37 which in turn is secured to a fitting 38 in the cable 10 providing a pressure proof connection to the by-pass line 36. In similar manner on the opposite end, the by-pass line 36 is connected to an elbow 39 which is sealed into a connector 40 attached to the cable 18. A separate connector 41 is sealed between the cable 18 and the cable 20 providing communication therebetween, so that pressurization of one cable will pressurize the other scale. A regulator 42 inserted in the by-pass line 36 is arranged to bleed pressure into the splice case at a predetermined pressure, which is less than the line pressure in the cables. The regulator valve 42 may be any conventional fluid regulator valve for bleeding pressure from a higher line pressure to a lower pressure chamber.

The system is installed on a cable generally as follows. At the cable ends where the lines are to be spliced and placed in a splice case, a dam or pressure block is poured around the outside of the end of a cable and the extending lines which are to be spliced. The dam is formed of potting material as explained above, and the liquid precursors set up rapidly sealing the end of the cable and sealing around all of the wires forming a pressure proof dam. The by-pass is then installed in the end of one cable ahead of the dam and it is extended to the other two cables 18 and 20 behind the dam on them so that pressure from the cable 10 may be used to pressurize cables 18 and 20. The splices are then formed in the lines or wires in the area of 22. The splice case 26 is applied around the splice. The edge of the split splice case is sealed and the case is sealed to the cables forming a pressure type enclosure. The regulator valve is set a pressure which is substantially lower than the pressure in the lines, and it is arranged to pressurize the case so long as air is in the cables at a pre-set minimum pressure. For example, the line pressure in the cables may be set from 6 to 10 pounds and the regulator 42 is arranged to bleed air into the splice case at about 3 pounds. Thus the splice case is pressurized at a desired pressure and the by-pass system will carry the necessary pressure from one cable to the cables beyond the splice. If one splice case leaks, the rest of the system will maintain the necessary air pressure and only a small amount of air will leak into the leaking splice case.

Figure 3:
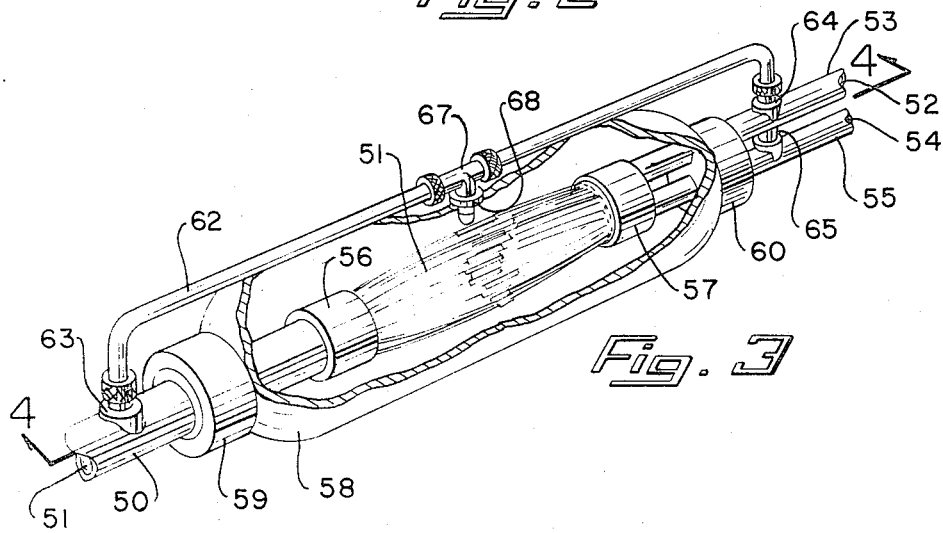
FIG. 3 is a perspective cutaway of an external by-pass system for a pressurized cable communications system.
Figure 4:
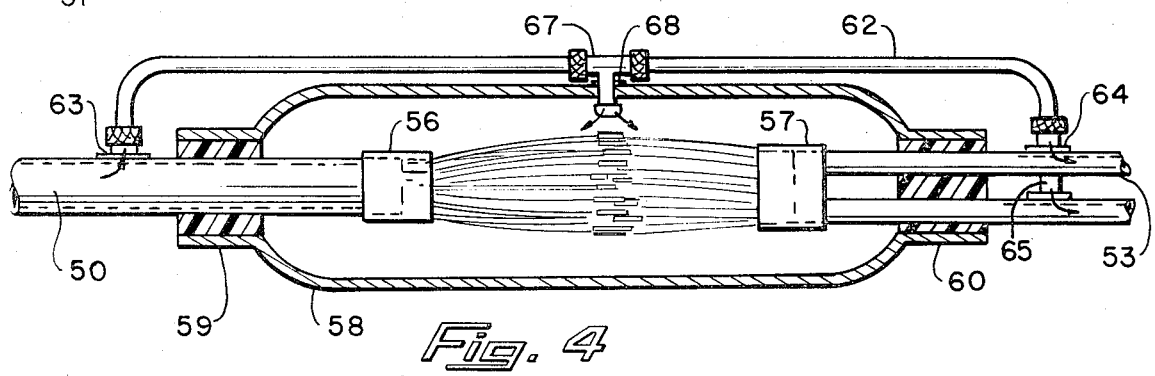
FIG. 4 is a cross-sectional view of the device of FIG. 3 taken along section line 4—4 and illustrating pressurizing a divided cable from a single cable.

In the form of the invention shown in FIGS. 3 and 4, an external by-pass is utilized around a splice case with a regulator bleeding a predetermined amount of air into the splice case. In this case, a cable 50 carrying lines 51 is arranged to be spliced to lines 52 in cable 53 and lines 54 in cable 55. The end of the cable is potted with a dam 56 and the lines 51 extending therefrom in a manner similar to that described for FIGS. 1 and 2. In a similar manner, a dam 57 seals the ends of the cables 53 and 55 leaving the lines extending therein for splicing with the lines 51 from the cable 50. A splice case 58 is sealed at end 59 to the cable 50 by means of potting compound as explained for FIG. 1, and end 60 is, likewise, sealed to cables 53 and 55 in a manner similar to that described above. A by-pass line 62 is connected to a fitting 63 secured in the cable 50 at one end and to a fitting 64 fitted into cable 53. A joining fitting 65 provides a communication between the two cables 53 and 55. A regulating valve 67 is included in the by-pass line 62, and it is placed through a fitting 68 with a bleed into the splice case 58.

The installation of this unit is similar to the installation of the unit in FIGS. 1 and 2; however, the by-pass may be added after the splice has been completed, the splice case attached and sealed to the cables. The by-pass may then be added for pressurizing the downstream cables from the upstream cable and to provide means for injecting air under a lesser pressure into the case around the splice.

The advantages of using the method and apparatus of the invention are to provide air under pressure in a splice case and for to maintain pressure in the cable system. By utilizing a lesser pressure of air in the splice case, a light duty case may be used in the pressurized system, and this will also permit the use of light weight plastic cases which are presently used for non-pressurized cable systems. The by-pass system provides protection from losing pressure from the entire system in the event of a leaking splice case in the system. The lighter duty cases are easier to seal and to maintain pressure in the system.

Since the splice cases are split, it is necessary to seal all the splice cases around the ends where the cables enter the case as well as along the edges that seal together on the other part of the case.

I claim:

1. A pressurized cable splice comprising in combination with one pressurized cable having extending wires spliced to corresponding wires extending from two cables and all said cables having a pressurizable covering:

of a splice case sealed in pressure tight relation to the cables at each end with the end of each cable covering terminating in said splice case;

a dam on each end of each cable sealing said covering in a pressure holding seal on each said end and around the protruding wires;

a by-pass conduit connected to said one cable at one end of said splice case and to said two cables at the other end including a connector mounted between said two cables for simultaneously pressurizing both said cables, each connection being on the cable side of said dams whereby said by-pass communicates with said pressurizable cables; and regulating valve means in by-pass communicating wth the interior of said splice case, for pressurizing said splice case at a pressure lower than the pressure in said cables.

* * * * *

UNITED STATES PATENT OFFICE
CERTIFICATE OF CORRECTION

Patent No. 3,770,871     Dated November 6, 1973

Inventor(s) Jack P. Goodman

It is certified that error appears in the above-identified patent and that said Letters Patent are hereby corrected as shown below:

Column 2, line 55, "scale" should be -- cable --.

Signed and sealed this 4th day of June 1974.

(SEAL)
Attest:

EDWARD M. FLETCHER, JR.
Atttesting Officer

C. MARSHALL DANN
Commissioner of Patents